United States Patent [19]

Atsumi et al.

[11] 4,405,648

[45] Sep. 20, 1983

[54] METHOD FOR PRODUCING BREAD

[75] Inventors: Shin-Ichi Atsumi, Kawagoe; Masayuki Sasaki, Tsurugashima; Ikuo Kitamura, Kamifukuoka, all of Japan

[73] Assignee: Nisshin Flour Milling Co., Ltd., Ohi, Japan

[21] Appl. No.: 235,160

[22] Filed: Feb. 13, 1981

Related U.S. Application Data

[63] Continuation of Ser. No. 70,322, Aug. 24, 1979, abandoned.

[51] Int. Cl.$^3$ ............................ A21D 2/06; A21D 2/22
[52] U.S. Cl. ........................................ 426/19; 426/23; 426/24; 426/26

[58] Field of Search ........................ 426/19, 23, 24, 25, 426/26, 62, 653

[56] References Cited

U.S. PATENT DOCUMENTS

| | | | |
|---|---|---|---|
| 3,574,634 | 4/1971 | Singer | 426/19 |
| 3,934,040 | 1/1976 | Simerak et al. | 426/62 |
| 4,109,018 | 8/1978 | Thompson | 426/19 |

*Primary Examiner*—Raymond N. Jones
*Assistant Examiner*—Elizabeth A. Hatcher
*Attorney, Agent, or Firm*—Abelman, Frayne & Rezac

[57] ABSTRACT

A method for producing bread comprising the steps of kneading a dough containing wheat flour with an additive mixture consisting of a L-ascorbic acid; a reducing agent, and a thickner, fermenting the dough and baking same.

2 Claims, No Drawings

METHOD FOR PRODUCING BREAD

This is a continuation of application Ser. No. 70,322 filed Aug. 24, 1979, now abandoned.

The present invention relates to a method for producing bread of good quality. More particularly, this invention relates to a method for producing bread wherein, during kneading a dough, a L-ascorbic acid, a reducing agent other than the L-ascorbic acid and a thickening agent are added thereto.

There have conventionally been attempted to increase the volume of bread to improve the appearance of the inner and outer phases of the bread and simultaneously to improve its taste. For such a purpose, L-ascorbic acid is employed but it does not alone provide breads of satisfactory quality.

As a result of extensive studies, we have found that a bread of extremely good quality can be obtained by kneading a dough together with three additives, namely, a L-ascorbic acid which can oxidatively act upon the dough to stiffen the same and thereby to improve the gas retention capacity of the same, a reducing agent (other than the L-ascorbic acid) which serves oppositely to the L-ascorbic acid to soften the dough, and a thickening agent.

According to the present invention, there is provided a method for producing bread by employing yeast, wherein a dough is kneaded together with three kinds of additives, namely, a L-ascorbic acid, a reducing agent other than the L-ascorbic acid and a thickening agent, and then fermented and baked.

In the present specification, the term "bread" includes not only Pullman type (flat-top) loafbread, English type (open-top) loafbread, roll bread, milk bread, French bread, and butter rolls, but also sweet bread such as bread filled with various jams, buns filled with sweet bean paste, loafbread containing raisins, bread containing egg and buns filled with cream paste, bread containing cereal flour other than wheat flour such as rye bread, rice bread, unpolished rice bread and whole wheat flour bread, and those fermented by yeast such as rusk, crackers and steamed buns filled with various fillers such as bean paste or cooked meat and vegetable mixture.

In carrying out the method according to the present invention, a L-ascorbic acid, a thickening agent and a reducing agent may be added during any of the steps of producing breads.

The term "a L-ascorbic acid", which is employed herein means to include L-ascorbic acid, dehydroascorbic acid or their salts. The L-ascorbic acid may suitably be added at a proportion of 2–100 ppm of the weight of wheat flour. No significant effect will be brought about with an incorporation less than the above proportion and no substantial further effect will be expected even if the L-ascorbic acid is added in an amount beyond the above proportion.

The term "a reducing agent other than the L-ascorbic acid", which is employed herein includes any additive which acts upon a dough in a reducing fashion and is usable in foodstuff, for example, such as cysteine, glucose-cysteine, glutathione, thioctic acid ($\alpha$-lipoic acid), and their salts; keratin hydrolysates, containing cysteine; natural substances such as powdered yeast and germs of grains which contain glutathione; and sulfites such as sodium sulfite, sodium hydrosulfite, potassium metabisulfite. Such a reducing agent may preferably be added, as its functional group having reducing power, in an amount of 0.02–1.0 microgram equivalent per gram of wheat flour. More preferably, the proportion ranges 0.05–0.2 microgram equivalent. Below 0.02 microgram, it is impossible to achieve the intended effect of the present invention and over 1 microgram equivalent, the operability of a dough kneader will become poor as the dough becomes stickier and the gas retainability of the dough will be reduced thereby resulting in the volume reduction of the product.

Suitable thickening agents usable in the present invention include xanthan gum, carrageenan, tamarind seed gum, guar gum, locust bean gum, furcellaran, gum Arabic, alginic acid, ghatti gum, gum tragacanth, karaya gum, powdered yams, carboxymethyl starch and pullulan. Xanthan gum, ghatti gum, and gum Arabic are particularly preferred. The thickening agent may normally be added in an amount of 10–3000 ppm of the weight of wheat flour but shall not be limited to that range. For xanthan gum, ghatti gum or gum Arabic, 50–1000 ppm are preferred. If such a thickener is added in an extremely low concentration, its effectiveness will not show up. On the other hand, if too much is added, the extensibility of a dough will then be rendered poor thereby resulting in the small volume of the product obtained after baking.

These additives may be incorporated in a dough during its kneading operation and then thoroughly mixed together with the dough. In the sponge dough method, such additives may be added during the kneading operation of the initial composition but better results will be obtainable if they are incorporated during the primary kneading operation of the dough. According to the method of the present invention, it is possible to obtain bread whose volume is sufficiently large and whose inner phase (crumb grain), outer phase (bread color, and appearance of crust) and texture (feeling obtained by pressing the texture with a finger) are satisfactory. In addition, the handling of dough is easy as the dough is not excessively sticky. The effectiveness of such additives becomes more apparent where no oxidizing agent is employed.

In order to show the effectiveness of the method according to this invention, the following experiments were conducted. To the below-described basic composition, the additives in Table I were added and various breads were produced in accordance with the straight dough method.

| Basic formula | |
|---|---|
| Wheat flour | 300 g |
| Yeast | 6 g |
| Sugar | 9 g |
| Salt | 6 g |
| Shortening | 9 g |
| Water | 210 ml |

TABLE I

| | (additives) | | |
|---|---|---|---|
| | L-ascorbic acid (ppm) | Cysteine (ppm) | Xanthan gum (ppm) |
| Present invention | 20 | 10 | 400 |
| Control | — | — | — |
| Comparison (1) | 20 | — | — |
| Comparison (2) | — | 10 | — |
| Comparison (3) | — | — | 400 |
| Comparison (4) | 20 | 10 | — |
| Comparison (5) | 20 | — | 400 |

TABLE I-continued

| | (additives) | | |
|---|---|---|---|
| | L-ascorbic acid (ppm) | Cysteine (ppm) | Xanthan gum (ppm) |
| Comparison (6) | — | 10 | 400 |

Baked products were compared in volume, inner phase and outer phase. The results are shown in Table II in which each symbol denotes as follows:

TABLE II

| | Volume (cc) | Inner phase | Outer phase | Texture |
|---|---|---|---|---|
| Present invention | 2070 | | | |
| Control | 1880 | XXX | XXX | XXX |
| Comparison (1) | 1950 | XX | XXX | XX |
| Comparison (2) | 2010 | XX | XX | XX |
| Comparison (3) | 1900 | XX | X | X |
| Comparison (4) | 1970 | X | X | X |
| Comparison (5) | 1910 | X | XX | X |
| Comparison (6) | 2020 | X | X | X | good
X poor (of no commercial value)
XX poorer (of no commercial value)
XXX poorest (of no commercial value)

EXAMPLE 1

To the below-described straight dough formula, were added and mixed 0.5 g of L-ascorbic acid, 0.5 g of cysteine and 20 g of xanthan gum, and the thus prepared dough was fermented. Proofed and then baked in accordance with the below-described conditions. Loafbread was obtained. The bread was excellent in shape, color and texture.

| Straight dough formula | |
|---|---|
| Wheat flour | 25000 g |
| Yeast | 500 g |
| Salt | 500 g |
| Water | 16750 ml |
| Sugar | 1500 g |
| Shortening | 1250 g |
| Yeast food | 25 g |

The yeast food referred to in the above consists of calcium monophosphate, calcium diphosphate, ammonium chloride, calcium carbonate, calcium sulfate, malt flour and starch.

| Bread-making conditions | |
|---|---|
| First fermentation | 90 minutes at 27° C. |
| Second fermentation | 30 minutes at 27° C. |
| Bench time | 17 minutes |
| Final proof | 40 minutes at 38° C. |
| Baking | 30 minutes at 200° C. |

EXAMPLE 2

A mixture of the below-described sponge formula was kneaded and then allowed to ferment for 4 hours at 27° C. An additional mixture for the below-described dough formula mixed with 0.5 g of L-ascorbic acid, 0.25 g of sodium sulfite and 12 g of ghatti gum, was incorporated with the above sponge dough. The resulted dough was allowed to ferment for 35 minutes at 27° C. and then baked for 30 minutes at 200° C. to produce loafbread.

| Sponge formula | |
|---|---|
| Wheat flour | 17500 g |
| Yeast | 500 g |
| Yeast food | 25 g |
| Water | 10 lit. |
| Dough formula | |
| Wheat flour | 7500 g |
| Salt | 500 g |
| Sugar | 1250 g |
| Shortening | 1250 g |
| Water | 6250 g |

Apart from the above experiment, L-ascorbic acid, sodium sulfite and ghatti gum, which were added to the dough formula in the above experiment, were added to the sponge dough composition, and loafbread was baked while maintaining the other conditions identical to those in the above experiment. Both methods provided loafbread of excellent quality.

EXAMPLE 3

To the butter-roll dough, which had been prepared in accordance with the below-mentioned butter-roll formula, were added 0.1 g of dehydro-ascorbic acid, 0.01 g of glutathione and 0.5 g of tragacanth gum, and butter-rolls were produced in accordance with the following conditions:

| Butter-roll formula | |
|---|---|
| Wheat flour | 1000 g |
| Yeast | 25 g |
| Salt | 15 g |
| Sugar | 120 g |
| Fat | 150 g |
| Egg | 100 g |
| Powdered skim milk | 30 g |
| Yeast food | 1 g |
| Bread-making formula | |
| Fermentation | 60 minutes at 27° C. |
| Bench time | 15 minutes |
| Final proof | 30 minutes |
| Baking | 10 minutes at 200° C. |

EXAMPLE 4

To the dough, which had been prepared at 15° C. in accordance with the below-described frozen dough composition, are added 0.06 g of dehydro-ascorbic acid, 0.01 g of L-cysteine and 0.5 g of xanthan gum. The resultant mixture was then kneaded and the dough was rolled to the thickness of 10 mm. The thus rolled dough sheet was frozen at −20° C. to provide frozen dough. After the lapse of a period of three weeks from the preparation of the frozen dough, the frozen dough was defrosted and baked at 200° C. for 10 minutes. Bread of good quality resulted.

| Frozen dough composition | |
|---|---|
| Wheat flour | 1000 g |
| Yeast | 50 g |
| Salt | 15 g |
| Sugar | 100 g |
| Fat | 100 g |
| Egg | 100 g |
| Milk | 250 g |
| Fat | 500 g |

EXAMPLE 5

To the sponge dough having the sponge formula of Example 2, was added 0.3 g of L-ascorbic acid and the mixture was kneaded to obtain a sponge, which was then allowed to ferment for 4 hours at 27° C. Then, to the dough having the dough formula of Example 2, were incorporated 0.2 g of DL-cysteine and 60 g of xanthan gum. The mixture was then combined with the sponge dough and kneaded. The resultant dough was allowed to ferment for 35 minutes at 27° C. and thereafter baked for 30 minutes at 200° C. Loafbread of good quality was obtained.

What we claim is:

1. A method for producing bread comprising the steps of (1) kneading a dough containing wheat flour with an additive mixture consisting of a L-ascorbic acid; a reducing agent selected from the group consisting of cysteine, glucose-cysteine, glutathione, thioctic acid and their salts, keratin hydrolysates containing cysteine, powdered yeast, germs of grains which contain glutathione, alkaline metal sulfites, alkali metal hydrosulfites and alkali metal metabisulfites; and a thickener selected from the group consisting of xanthan gum, carrageenan, tamarind seed gum, guar gum, locust bean gum, furcellaran, gum Arabic, alginic acid, ghatti gum, tragacanth gum, karaya gum, powdered yams, carboxymethyl starch and pullulan, wherein the L-ascorbic acid is added in the amount of 2 to 100 ppm of weight of the wheat flour, the reducing agent is added in the amount of 0.02 to 1.0 microgram equivalent of its reducing functional group per gram of wheat flour and the thickener is added in the amount of 10 to 3000 ppm of the weight of the wheat flour, (2) allowing the kneaded dough to ferment, and (3) baking the fermented dough.

2. The method of claim 1 wherein the L-ascorbic acid is selected from the group consisting of L-ascorbic acid, dehydroascorbic acid and their salts.

* * * * *